May 15, 1923.

J. P. GERAGHTY

AUTOMOBILE LOCK

Filed May 12, 1920

WITNESSES

INVENTOR
John P. Geraghty
BY
ATTORNEYS

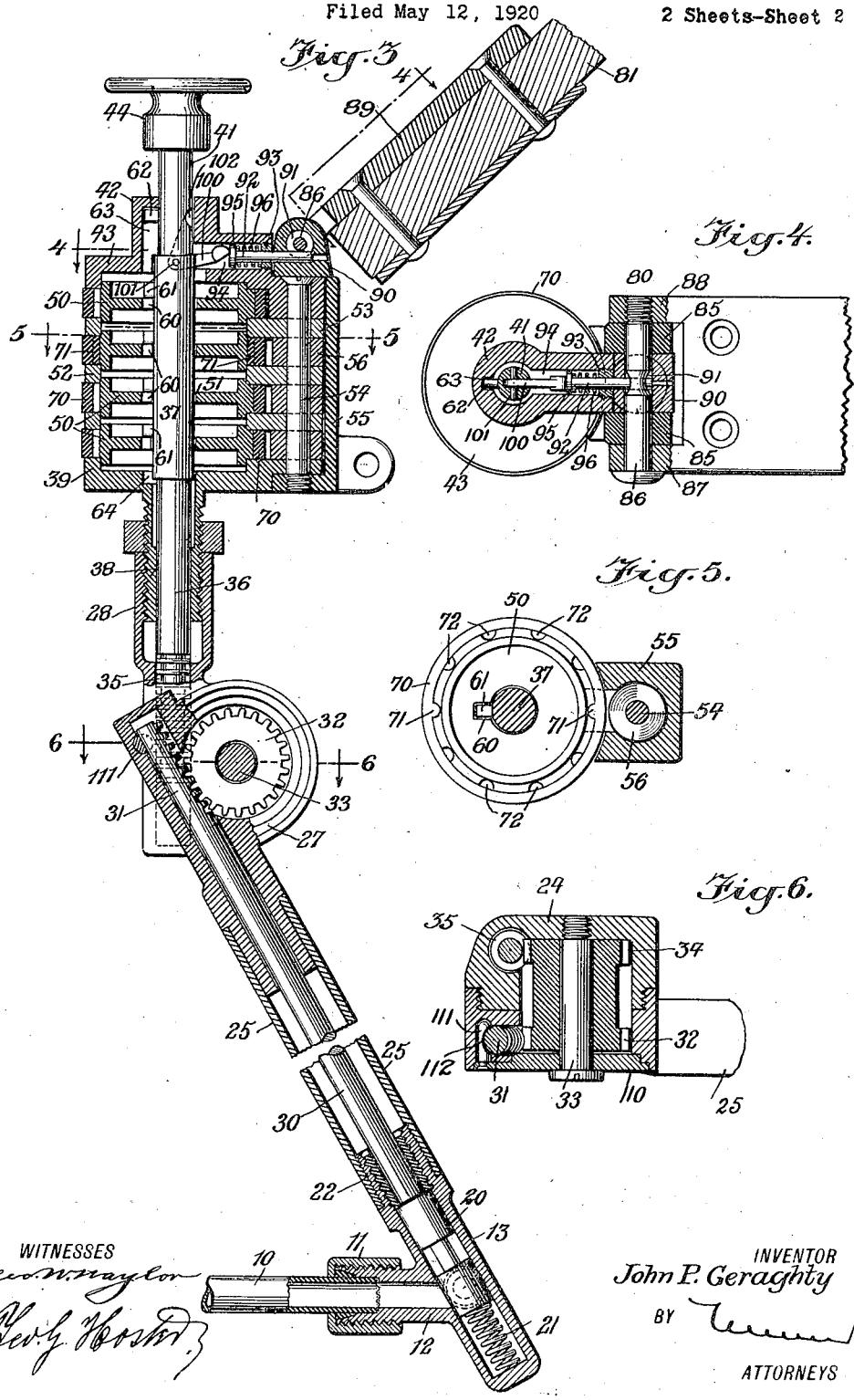

Patented May 15, 1923.

1,455,583

UNITED STATES PATENT OFFICE.

JOHN P. GERAGHTY, OF JERSEY CITY, NEW JERSEY.

AUTOMOBILE LOCK.

Application filed May 12, 1920. Serial No. 380,765.

*To all whom it may concern:*

Be it known that I, JOHN P. GERAGHTY, a citizen of the United States, and a resident of Jersey City, in the county of Hudson and State of New Jersey, have invented a new and Improved Automobile Lock, of which the following is a full, clear, and exact description.

The invention relates to locks for use on automobiles, auto-trucks and other power driven vehicles or crafts using gasolene or other liquid fuel as the motive agent.

The object of the invention is to provide a new and improved lock more especially designed to prevent feeding of the gasolene to the carbureter and thus prevent an unauthorized person from running the vehicle.

Another object is to securely lock the device to the vehicle and thus prevent removal of or tampering with the lock by unauthorized persons.

Another object is to permit of readily attaching the lock to power driven vehicles as now constructed and without requiring a material change thereof.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 3 is an enlarged sectional side elevation of the improved lock as applied;

Figure 4 is a sectional plan view of the same on the line 4—4 of Figure 3;

Figure 5 is a similar view of the same on the line 5—5 of Figure 3; and

Figure 6 is a similar view of the same on the line 6—6 of Figure 3.

Figure 1:
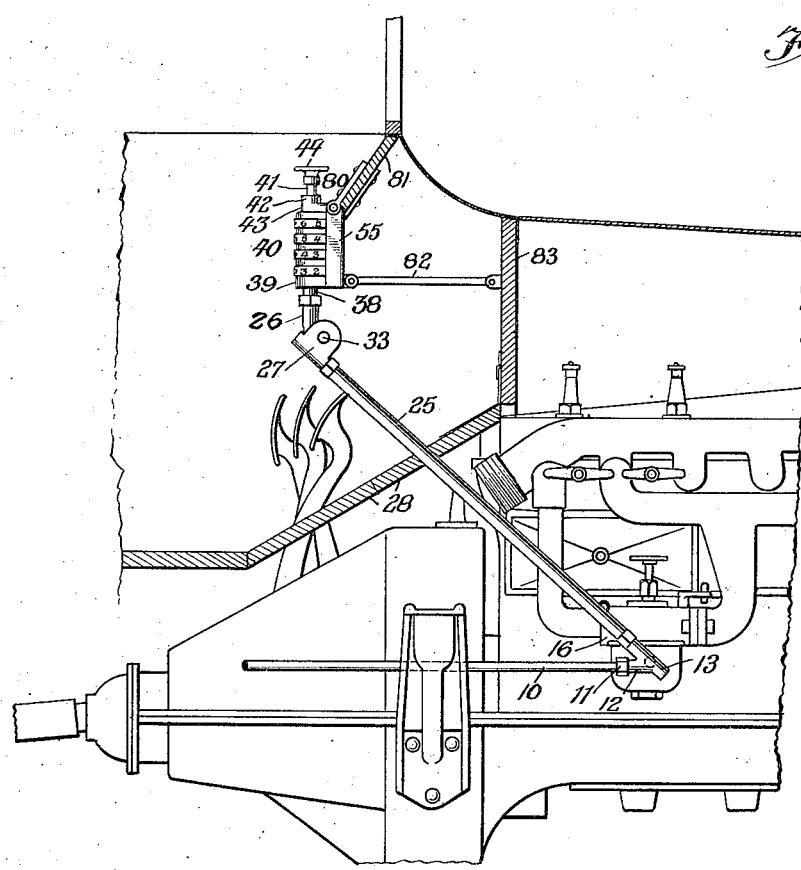
Figure 1 is a side elevation of the improved lock as applied to a Ford automobile, parts of which are shown in section.

The outlet end of the gasolene feed pipe 10 is connected by a coupling 11 (see Figure 3) with a nipple 12 formed on a valve body 13 having a nipple 14 connected with the inlet 15 (see Figure 2) of a carbureter 16 of an automobile or other power driven vehicle, motor boat, aeroplane or other machine or device. A piston valve 20 is mounted to slide in the valve body 13 and controls the connection between the nipples 12 and 14 and hence the connection between the feed pipe 10 and the carbureter 16. The valve 20 is pressed upward by a spring 21 seated in the bottom of the valve body 13 to hold the valve 20 in closed position and against a bearing 22 screwed or otherwise secured in the upper end of the valve body 13, as plainly shown in Figure 3. The valve body 13 is inclined upwardly and rearwardly, as plainly shown in Figures 1 and 3, and on the upper end of the valve body 13 is secured a tube 25 extending upwardly and rearwardly through the footboard 26 of the body of the automobile. The tube 25 forms a part of a housing 27 provided with a vertical extension 28. The housing 27 is preferably made in two parts screwed together, (see Fig. 6) one of the sections being part of the tube 25 and the other having the extension 28. By this arrangement the casing sections can be readily adjusted to vary the angle between the tube 25 and the extension 28 according to conditions on different automobiles.

In the bearing 22 is mounted to slide the lower portion of a bolt or stem 30 engaging or forming part of the upper end of the valve 20, and the upper portion of the rod or stem 30 is mounted to slide in the housing 27 and is provided with a rack 31 in mesh with a gear wheel 32 mounted to turn on a stud 33 attached to the housing 27. The gear wheel 32 is integral with another gear wheel 34 thus forming a double gear wheel, and this second gear wheel 34 is in mesh with a rack 35 formed on the lower reduced portion 36 of a vertical spindle 37 extending through the extension 28 and through a nipple 38 screwing into the extension 28.

The nipple 38 forms an integral part of the bottom 39 of a lock casing 40 of a permutation lock, of which the spindle 37 is a sliding member. The upper reduced portion 41 of the spindle 37 extends through a boss 42 integral with the top 43 of the lock casing 40 and on the upper outer end of the reduced spindle portion is arranged a knob 44 adapted to be manipulated by the operator in charge of the automobile.

Between the bottom 39 and the top 43 of the lock casing 40 are arranged a plurality of disk tumblers 50 having central openings 51 through which extends the spindle 37. The tumblers 50 are held in spaced relation one to the other by spacing rings 52 having lugs 53 engaged by a bolt 54 which engages the top 43, the bottom 39 and the back 55 of the lock casing 40 to hold the said parts in place. Washers 56 on the bolt 54 hold the lugs 53 in spaced relation.

The tumblers 50 are provided in the walls of their central openings with notches 60, and the spindle 37 is provided above the openings with vertically alined lugs 61 adapted to pass through the said notches 60 at the time the latter are in vertical alinement, as shown in Figure 3. If any one, several or all of the tumblers, however, are turned and the corresponding notches 60 move out of engagement with the corresponding lugs 61 then downward movement of the spindle 37 is prevented and the valve 20 is held in closed position. When the notches 60 are in alinement with the lugs 61 then the operator can push the spindle 37 downward to rotate the gear wheels 34, 32 whereby the rod or stem 30 is moved downward and likewise the valve 20 to thus move the latter into open position to connect the feed pipe 10 with the carbureter 16. The reduced portion 41 of the spindle 37 is provided with a key 62 slidingly engaging a keyway 63 formed in the boss 42 to prevent turning of the spindle 37. The downward sliding movement of the spindle 37 is limited by the lowermost lug 61 engaging a recess 64 formed in the upper face of the bottom 39 of the lock casing 40.

Each of the tumblers 50 is provided with a removable rim 70 provided on its peripheral face with concentric numerals or other characters used for setting the lock to any desired combination. Each rim 70 is provided at its inner face with one or more integral lugs 71 adapted to engage any one of a plurality of notches 72 formed on the peripheral face of the body of the tumbler 50. In practice, the number of notches 72 on each tumbler 50 corresponds to the number of characters on the peripheral face of the corresponding rim 70. By the arrangement described, the rims 70 can be readily reset on their tumbler bodies to provide a large number of different combinations, that is, combinations that can be made by the operator in charge of the automobile.

Figure 2:
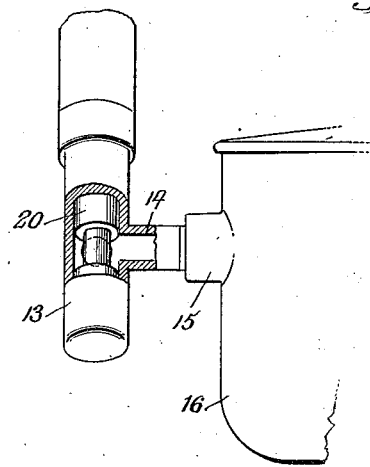
Figure 2 is an enlarged front elevation partly in section of the valve connecting the feed pipe with the carbureter.

The lock casing 40 is connected by a hinge 80 with the instrument board 81 and by a link 82 with the dashboard 83 of the automobile (see Figures 1 and 3). The hinge 80 is arranged to prevent an unauthorized person from removing the permutation lock from the automobile and for this purpose the following construction is made. The back 55 of the casing 40 is provided on its upper end with spaced eyes 85 through which extends a pintle 86 extending through an eye 87 and screwing in an eye 88, the eyes 87 and 88 being formed on the hinge leaf 89 riveted or otherwise permanently secured to the instrument board 81. Between the eyes 85 of the back 55 is arranged an apertured block 90 which covers up the head of the casing bolt 54, and through this block 90 extends the pintle 86. The latter is provided within the block 90 with a reduced portion 91 adapted to be engaged by a locking bolt 92 mounted to slide longitudinally in the block 90 and extending through a bearing 93 arranged in a bore 94 formed on the top 43. The inner end of the bolt 92 is provided with a head 95 pressed on by one end of a spring 96 held in the bore 94 and seated on the bearing 93. The bolt head 95 is adapted to be engaged by the free end of a push arm 100 fulcrumed on a pivot 101 held on the spindle 37. When the spindle 37 moves into uppermost position then the arm 100 pushes the bolt 92 forward into engagement with the reduced portion 91 of the pintle 90 thus holding the latter against removal by unauthorized persons at the time the valve 20 is in closed position and the operator has temporarily left the automobile. The arm 100 is adapted to fold into a recess 102 formed in the spindle 37 and its reduced portion 41 whenever the spindle 37 is pushed downward. When the spindle 37 is moved downward by the operator after the tumblers of the permutation lock have been set to the proper combination by the operator then the arm 100 releases the bolt 92 and the latter moves rearward by the action of its spring 96 to withdraw the bolt 92 from the pintle 86 and thus allow removal of the same by the operator for detaching the permutation lock from the instrument board 81 and disassembling the permutation lock for changing the combination whenever it is desired to do so. It is understood that after the pintle 86 is removed the block 90 can be removed from the casing top 43 to enable the operator to gain access to the head of the bolt 54 for removing the latter to permit the operator to disassemble the lock casing for changing the combination or for other purposes. By the construction described the parts of the permutation lock can be readily assembled or disassembled and the lock can be securely fastened to the instrument board and without danger of being removed or tampered with by unauthorized persons. The stud 33 besides forming a bearing for the double gear wheel 32, 34 serves to hold the cover 110 of the housing 27 in place (see Fig. 6). On the cover is riveted a pin 111 having a cut-out portion 112 fitting the upper portion of the rod or stem 30 to hold the cover 110 against removal by an unauthorized person.

When the operator is in charge of the automobile the spindle 37 is pushed downward to cause the valve 20 to move into open position and thus connect the feed pipe 10 with the carbureter 16. The spindle 37 can now be locked in this lowermost position by the operator turning any one of the tumblers 50 to move the corresponding notch 60 out of register with the corresponding lug 61 of the spindle whereby the latter is held against upward movement. During the running of the automobile the operator need not pay any attention to the lock. When the automobile is stopped and the operator intends to leave the car then it is necessary for the operator to set the tumblers 50 to the desired combination to allow return or upward movement of the spindle 37 with a view to move the valve 20 into closed position. The operator next turns one or more tumblers to locking position to lock the spindle 37 in uppermost position and thereby prevent an unauthorized person from starting the engine and running off with the automobile owing to lack of fuel.

Having thus described my invention, I claim as new and desire to secure by Letters Patent:—

1. In a locking mechanism for automobiles and other power driven vehicles, a lock casing, a spindle slidable in the lock casing, tumblers in the casing and coacting with the said spindle to lock the spindle against sliding movement at the time the tumblers are in locking position, a hinge connecting the casing with a fixed part of the vehicle, the hinge having a pintle provided with a reduced portion, a spring-pressed bolt slidable in the casing and adapted to engage the said reduced pintle portion, and an arm pivoted on the spindle and adapted to engage the said bolt.

2. In a locking mechanism for automobiles and the like, a lock comprising a series of tumblers each provided with a central opening and a notch in the wall of the opening, a spindle having a series of lugs passing through said openings and notches of said tumblers, said spindle being formed at its lower end with an annular rack, a pinion meshing with said rack and a bolt adapted to be connected with mechanism to be locked and having teeth meshing with said pinion whereby said bolt is reciprocated in proportion to the reciprocation of the spindle.

3. In a lock of the character described, a spindle, means associated with the spindle for preventing the removal of the lock from the position in which it is secured when the same is locked, and further means associated with the lower end of the spindle adapted to be moved by the spindle for actuating further means controlling the fuel gas of the engine.

JOHN P. GERAGHTY.